United States Patent [19]

Chang

[11] Patent Number: 5,553,885

[45] Date of Patent: Sep. 10, 1996

[54] FOLDABLE STROLLER FRAME

[76] Inventor: Cheng-Tso Chang, No. 2, Lane 519, Chung-Cheng Rd., Yung-Kang City, Tainan Hsien, Taiwan

[21] Appl. No.: 428,694

[22] Filed: Apr. 25, 1995

[51] Int. Cl.⁶ .................................................. B62B 7/08
[52] U.S. Cl. ............................................ 280/642; 280/658
[58] Field of Search .................................. 280/642, 650, 280/651, 657, 658, 644

[56] References Cited

U.S. PATENT DOCUMENTS

| 2,803,470 | 8/1957 | Welsch | 280/642 |
| 4,529,219 | 7/1985 | Shamie | 280/642 |
| 4,770,437 | 9/1988 | Glaser | 280/642 |
| 5,074,575 | 12/1991 | Bigo | 280/642 |
| 5,106,116 | 4/1992 | Cherz | 280/642 |

FOREIGN PATENT DOCUMENTS 3435575  4/1986  Germany ................. 280/642

*Primary Examiner*—Richard M. Camby
*Attorney, Agent, or Firm*—Finnegan, Henderson, Farabow, Garrett & Dunner

[57] ABSTRACT

A foldable stroller frame includes a pair of front wheel support rods, a U-shaped handle with two arms, each of which is slidable relative to a respective one of said front wheel support rods between a first position, wherein the stroller frame is unfolded and wherein the arm is locked to the front wheel support rod so as to prevent movement relative to the front wheel support rod, and a second position, wherein the stroller frame is folded, and a pair of rear wheel support rods. A lock device is fixed to an upper end portion of each of the front wheel support rods and is connected slidably to a respective one of the arms in order to lock the arm in the first position against movement relative to the front wheel support rod when the stroller frame is unfolded. A pivot link is mounted slidably to each of the front wheel support rods and is fixed to a respective one of the arms. An upper end portion of a respective one of the rear wheel support rods is pivoted to the pivot link. The stroller frame further includes a pair of connecting rods, each of which has an upper end portion pivoted to the lock device, and a lower end portion pivoted to the respective one of the rear wheel support rods.

4 Claims, 9 Drawing Sheets

FOLDABLE STROLLER FRAME

BACKGROUND OF THE INVENTION

1. Field of the Invention

This invention relates to a foldable stroller frame, more particularly to an improved foldable stroller which is convenient to use and which occupies a relatively small space when folded.

2. Description of the Related Art

The improvement of this invention is directed to the foldable stroller frame of a conventional stroller shown in FIG. 1. As illustrated, the conventional stroller includes an inverted U-shaped handle 11 with two arms, a pair of front wheel support rods 12 each of which has an upper end portion and a lower end portion connected to a front wheel 17, and a pair of rear wheel support rods 13 each of which has an upper end portion connected to the upper end portion of the front wheel support rod 12, and a lower end portion connected to a rear wheel 18. Each of the arms of the handle 11 is slidable relative to a respective one of the front wheel support rods 12 between a first position, wherein the conventional stroller frame is unfolded, and a second position, wherein the conventional stroller frame is folded. The stroller frame includes a seat supporting device 14 consisting of a pair of horizontal connecting rods 141 each of which connects a respective one of the front wheel support rods 12 to a respective one of the rear wheel support rods 13, a pair of L-shaped seat supporting members 14 for supporting a seat 16 thereon, and a pair of sliding blocks 144 mounted slidably on the connecting rods 141 respectively. The seat 16 is provided with four positioning pins 161, 162 (only two are shown) which are respectively engaged within the positioning notches 143 of the connecting rods 141. A lock device 2 is pivoted to the upper end portion of a respective one of the front wheel support rods 12 and the upper end portion of a respective one of the rear wheel support rods 13, and has a through hole, through which one of the arms of the handle 11 passes slidably in a position parallel to the front wheel supporting rod 12. The arms of the handle 11 and the front wheel support rods 12 can slide within the lock devices 2 and two sleeves 15. A locking mechanism is provided on a respective one of the lock devices 2 so as to lock the arm of the handle 11 against movement relative to the front wheel support rod 12 when the arm of the handle 11 is placed in the first position.

When it is desired to fold the stroller frame for storage, each of the lock devices 2 is operated in order to permit the arm of the handle 11 to slide downward so as to be juxtaposed to the front wheel support rods 12, and the rear wheel support rods 13 are pressed toward the front wheel support rods 12 to be juxtaposed to the front wheel support rods 12 such that the rear wheels 18 are disposed on the front wheels 17. As shown in FIG. 4, since the front wheel support rods 12, the rear wheel support rods 13, and the arms of the handle 11 are juxtaposed to each other, and since both the front and rear wheels 17, 18 are disposed adjacent to the lower end portions of the front wheel support rods 12, the folded stroller frame occupies a relatively large space. It is inconvenient and inexpensive to store and transport the conventional stroller frame. Another drawback of the conventional stroller frame is that the lock devices 2 have a complicated structure such that the lock device is difficult and inconvenient to operate. In particular, as shown in FIGS. 2 and 3, the lock device 2 includes a lock body 21, a coiled compression spring 22, a generally Y-shaped element 23 with a forked end portion 232, an operation member 24 and a pivot pin 25. The lock body 21 includes a handle hole 211 formed therethrough for passage of the arm of the handle 11, a hole 212 communicated with the handle hole 211, two tab units 213 respectively and rotatably mounting-the pins 231 of the element 23 in the lock body 21, and two pivot holes 214. The pivot pin 25 extends through the hole 241 of the operation member 24 and the pivot holes 214 of the lock body 21 so as to mount the operation member 24 rotatably on the lock body 21. Two holes 26, 27 are formed in the lock body 21 so as to respectively couple with one of the front wheel support rods 12 and one of the rear wheel support rods 13.

As best shown in FIG. 3, the operation member 24 has a limiting barb 242 confining the spring 27 in the space between the operation member 24 and the lock body 21, and a limiting arm 243 biased by the spring 27 to confine the projection 111 of the handle 11 in the space between the limiting barb 242 and the limiting arm 243 when unfolding the stroller frame. When one desires to fold the stroller frame, the limiting barb 242 of the operation member 24 is pressed so as to permit the handle 11 to move relative to the lock body 21.

SUMMARY OF THE INVENTION

Therefore, the objective of this invention is to provide a foldable stroller frame with an improved structure such that the stroller frame occupies a relatively small space when folded. In addition, the stroller frame has a lock device with a simple structure, thereby simplifying the operation of the stroller frame.

A foldable stroller frame according to this invention includes a pair of front wheel support rods, each of which has an upper end portion and a lower end portion connected to a front wheel, and a U-shaped handle with two arms, each of which has a lower end portion. Each of the arms is slidable relative to a respective one of the front wheel support rods between a first position, wherein the stroller frame is unfolded and wherein the arm is locked to the front wheel support rod so as to prevent movement relative to the front wheel support rod, and a second position, wherein the stroller frame is folded. The stroller frame has a pair of rear wheel support rods, each of which has an upper end portion and a lower end portion connected to a rear wheel. A lock device is fixed to the upper end portion of each of the front wheel support rods and is connected slidably to a respective one of the arms in order to lock the arm in the first position against movement relative to the front wheel support rod when the stroller frame is unfolded. A pivot link is mounted slidably to each of the front wheel support rods between the upper and lower end portions thereof and is fixed to the respective one of the arms at a position between the lock device and the lower end portion of the respective one of the arms. The upper end portion of a respective one of the rear wheel support rods is pivoted to the pivot link. The stroller frame further includes a pair of connecting rods, each of which has an upper end portion pivoted to the lock device, and a lower end portion pivoted to the respective one of the rear wheel support rods.

Each of the lock devices includes a mounting seat fixed to the upper end portion of a respective one of the front wheel support rods and pivoted to the upper end portion of a respective one of the connecting rods. The mounting seat has a through hole through which a respective one of the arms passes slidably in a position parallel to the respective one of the front wheel support rods, a positioning member which is fixed to the respective one of the arms and which can be received removably in the through hole while the respective one of the arms is placed in the first position, a locking element which is received movably in the mounting seat and which is extendible into the through hole, and a compression spring for biasing the locking element to engage the positioning member so as to lock the respective one of the arms in the first position against movement relative to the respective one of the front wheel support rods when the stroller frame is unfolded.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
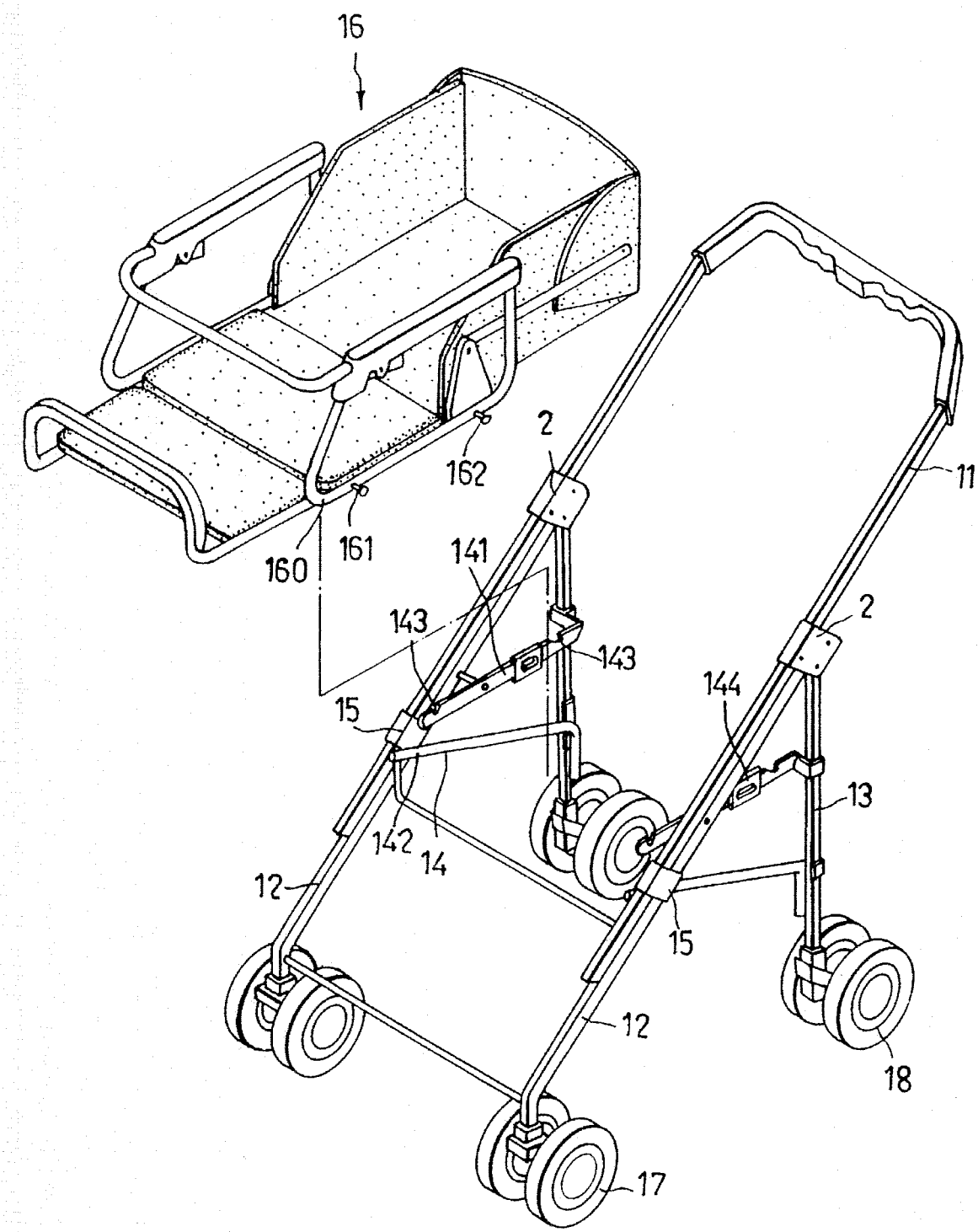
FIG. 1 is a partially exploded view of a stroller with a conventional stroller frame.
Figure 2:
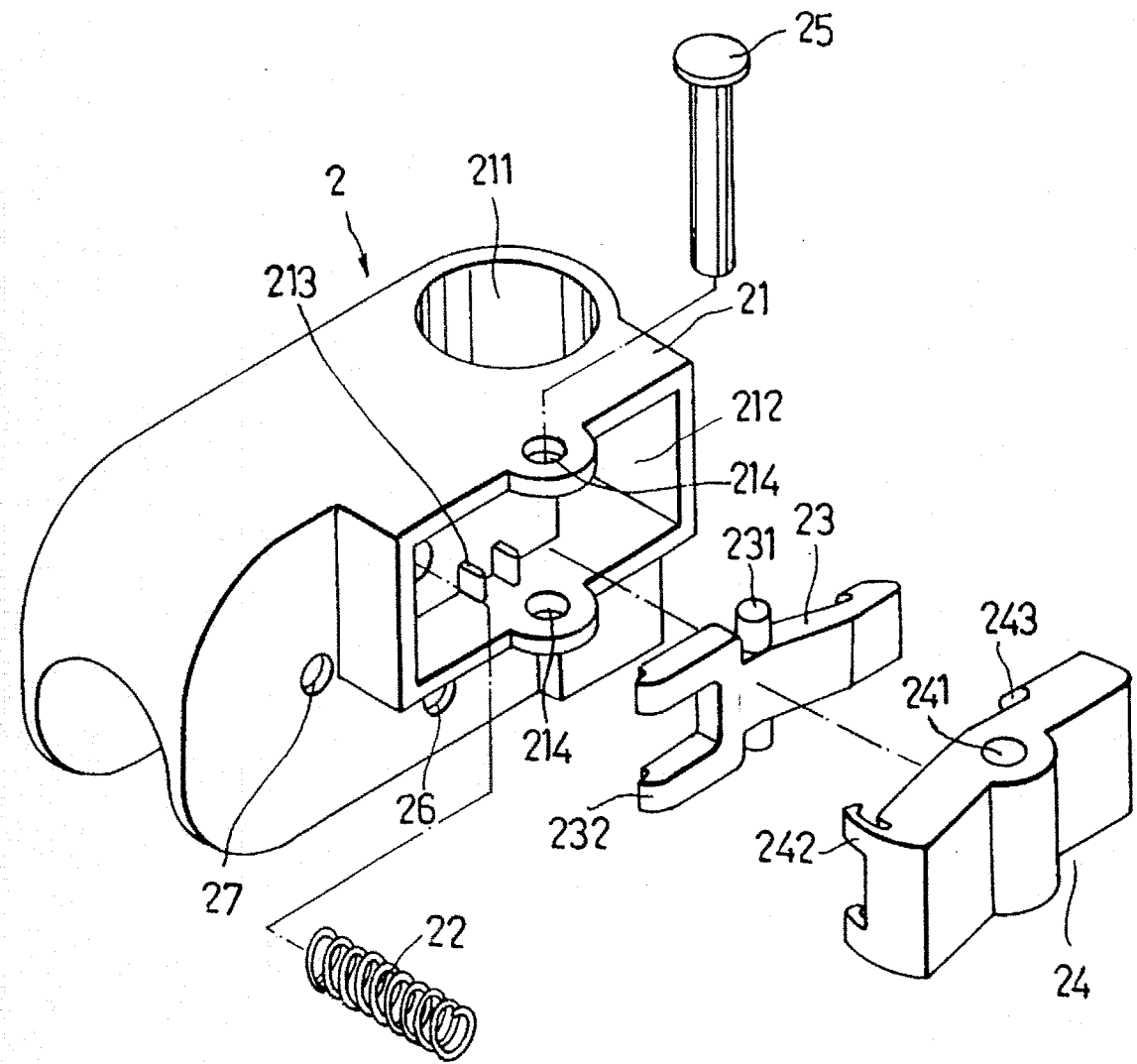
FIG. 2 is a partially exploded view showing the lock device of the conventional stroller frame.
Figure 4:
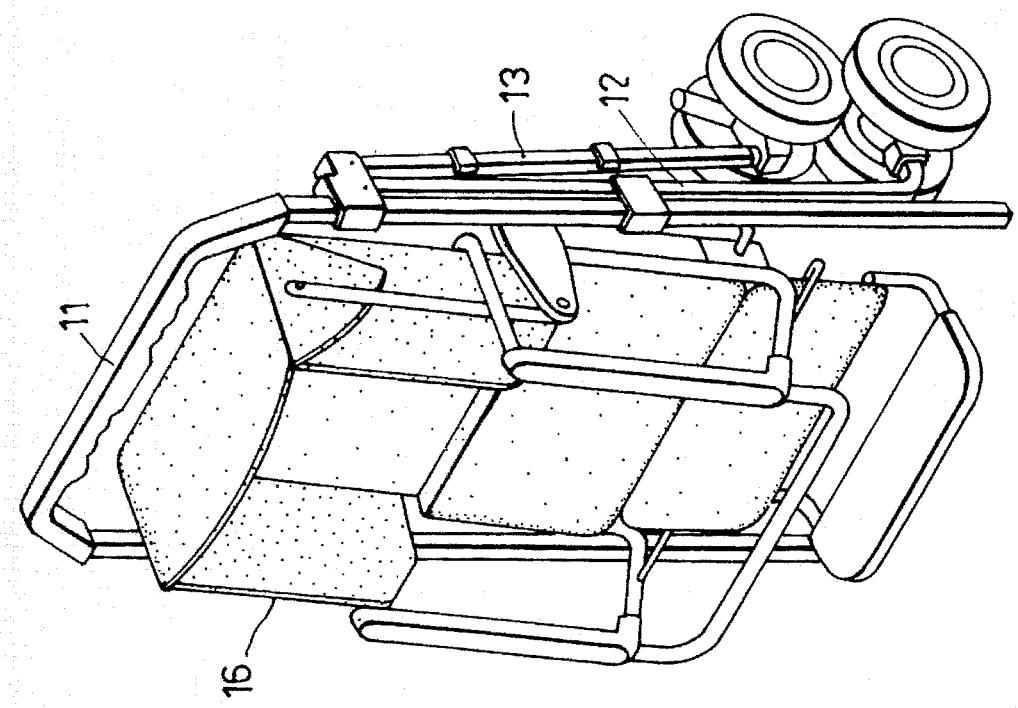
FIG. 4 is a perspective view showing the stroller of FIG. 1 when folded.
Figure 3:
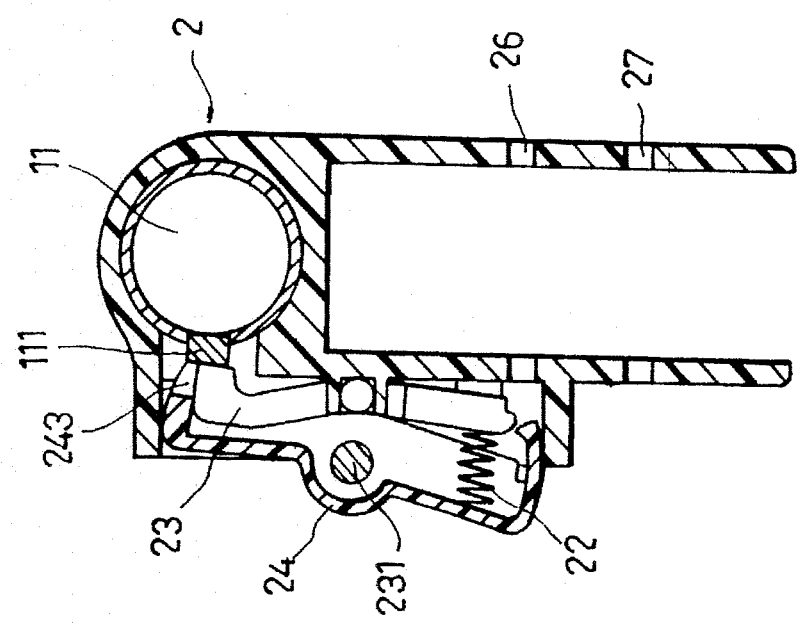
FIG. 3 is a sectional view showing the lock device of the conventional stroller frame.
Figure 5:
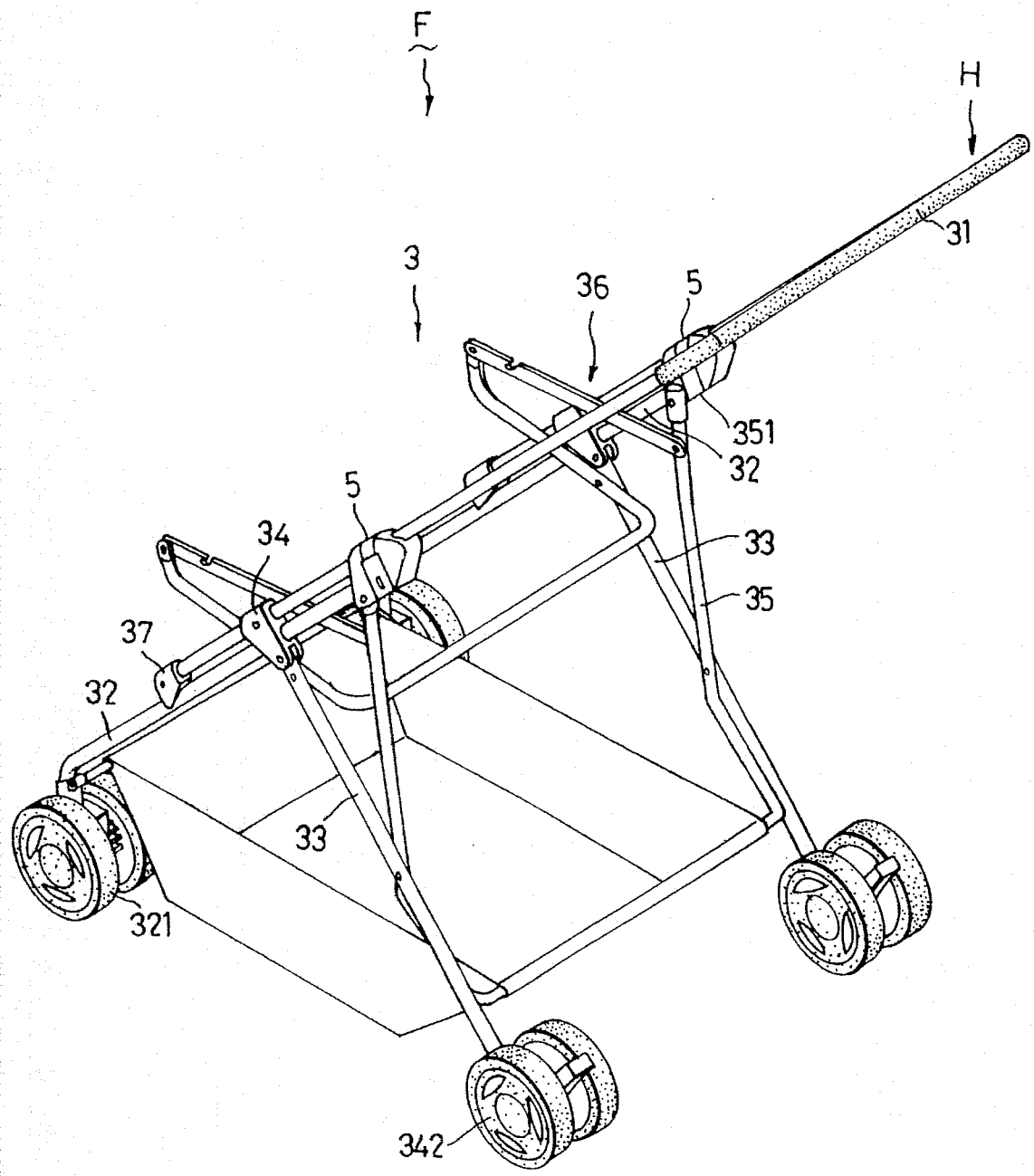
FIG. 5 is a perspective view of a foldable stroller frame according to this invention.
Figure 6:
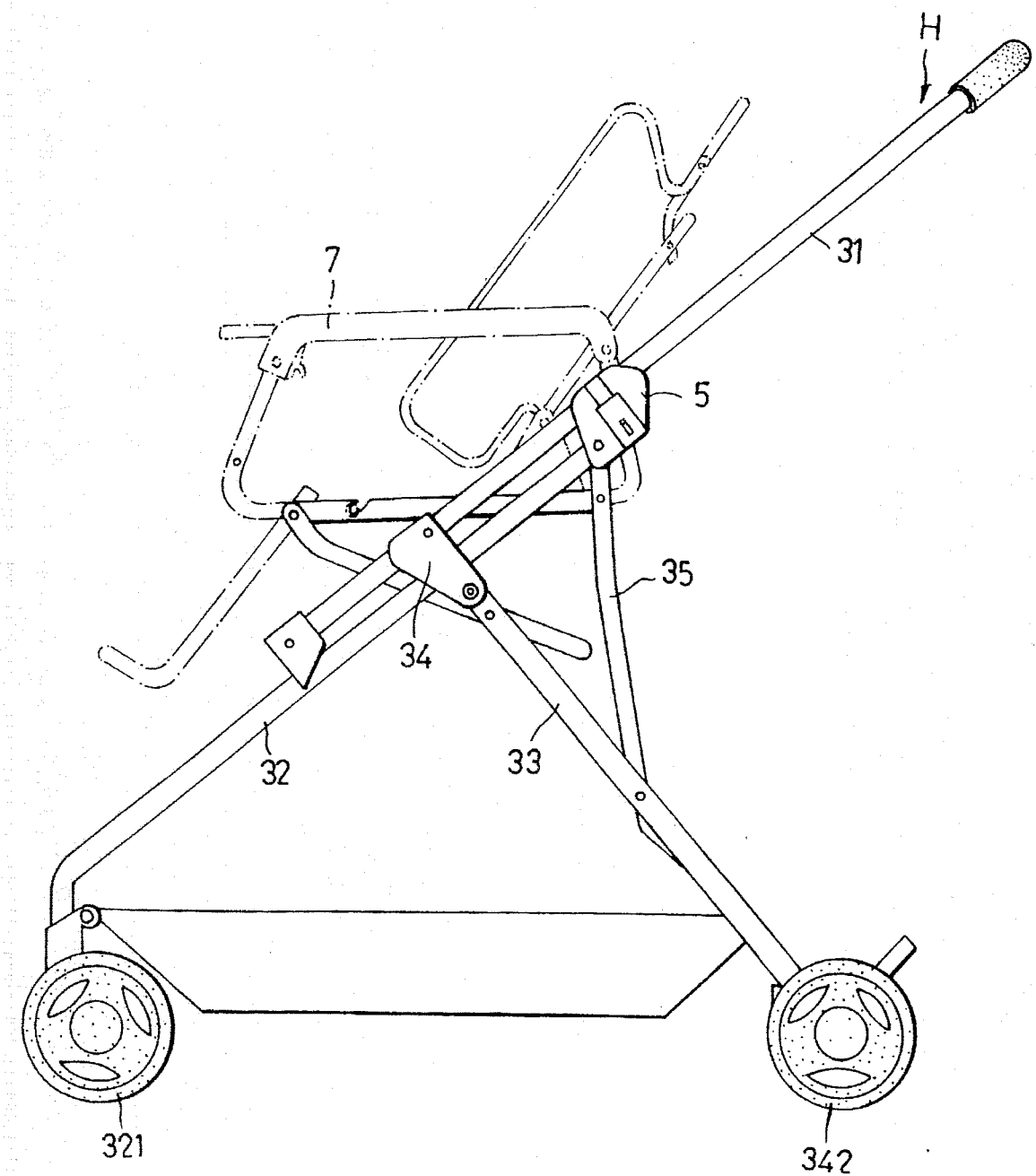
FIG. 6 is an elevational side view showing the foldable stroller frame of this invention.
Figure 7:
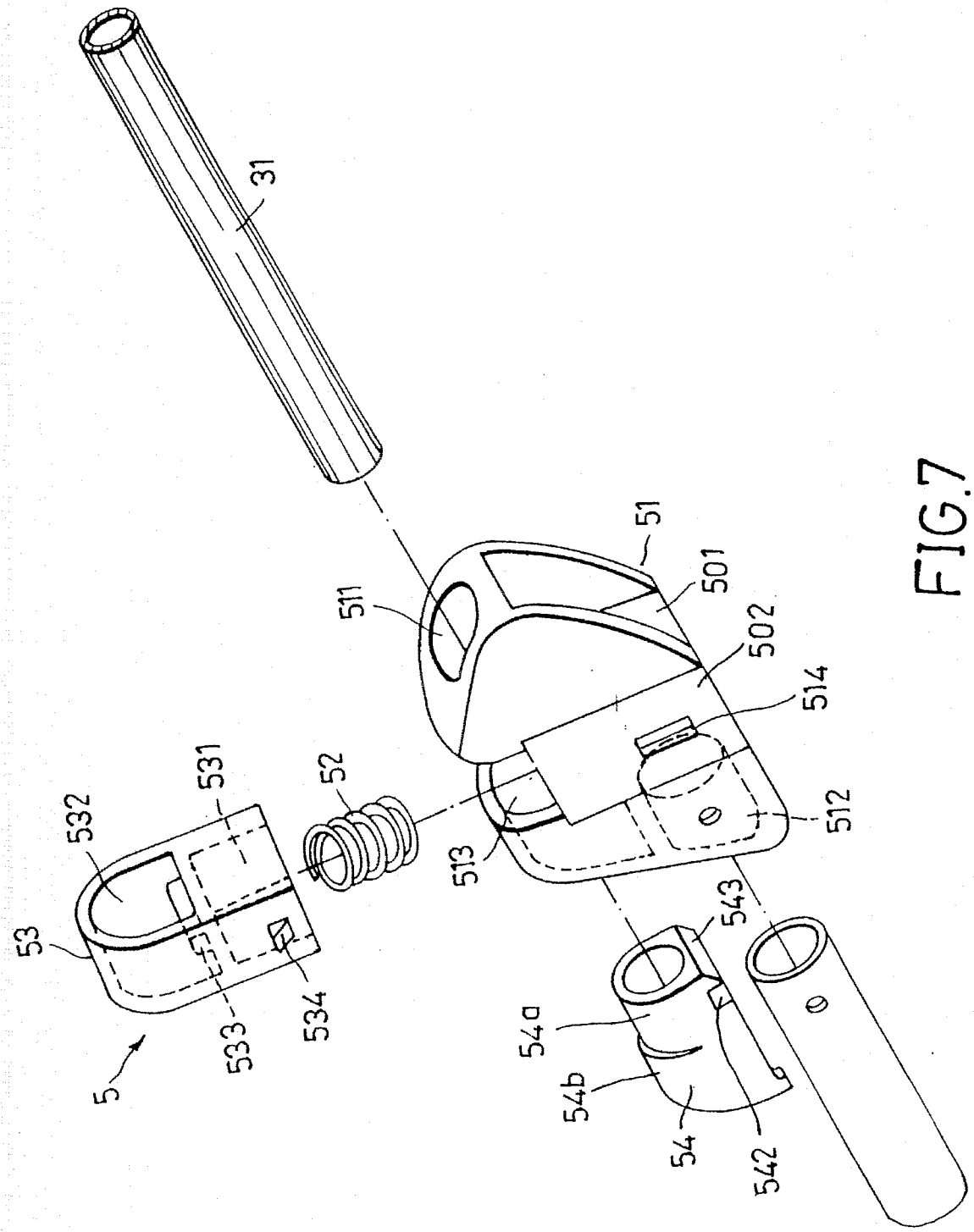
FIG. 7 is an exploded view showing the lock device of the foldable stroller frame according to this invention.

Referring to FIGS. 5 and 6, a foldable stroller frame (F) of this invention includes a pair of front wheel support rods 32, each of which has an upper end portion and a lower end portion connected to a front wheel 321, and a U-shaped handle (H) with two arms 31, each of which has a lower end portion provided with an anti-slip piece 37. Each arm 31 is slidable parallelly relative to a respective one of the front wheel support rods 32 between a first position, wherein the stroller frame (F) is unfolded and the arm 31 is locked to the front wheel support rod 32 to prevent its movement relative to the front wheel support rod 32, and a second position, wherein the stroller frame (F) is folded. The stroller frame (F) has a pair of rear wheel support rods 33, each of which has an upper end portion and a lower end portion connected to a rear wheel 342. A lock device 5 is pivoted to the upper end portion of each of the front wheel support rods 32 and is connected slidably to a respective one of the arms 31 in order to lock the arm 31 against movement relative to the front wheel support rod 32 so as to maintain the arm 31 in the first position when the stroller frame (F) is unfolded. A pivot link 34 is mounted slidably to each of the front wheel support rods 32 between the upper and lower end portions thereof and is fixed to a respective one of the arms 31 at a position between the lock device 5 and the lower end portion of the arm 31. The upper end portion of a respective one of the rear wheel support rods 33 is pivoted to the pivot link 34.

The stroller frame (F) includes a pair of connecting rods 35, each of which has an upper end portion pivoted to the lock device 5 and a lower end portion pivoted to a respective one of the rear wheel support rods 33 at a location between the upper and lower end portions of the rear wheel support rod 33. A first transverse rod 351 has two ends, each of which is connected to a distal end of the lower end portion of a respective one of the connecting rods 35 so as to form a U-shaped structure with the connecting rods 35. A second transverse rod 344 has two ends pivoted respectively to the rear wheel support rods 33 adjacent to the rear wheels 342. In addition, a seat support member 36 for supporting a baby seat 7 is mounted to the connecting rods 35, the front wheel support rods 32 and the rear wheel support rods 33.

A detailed structure of the lock device 5 is described as follows with reference to FIGS. 6 to 9.

The lock device 5 has a mounting seat 51 with an upper part 501, a lower part 503 and an intermediate part 502 between the upper and lower parts 501, 503. The mounting seat 51 has a recess 512 which is formed in the lower part 503 and to which the upper end portions of the front wheel support rod 32 and the rear wheel support rod 33 are pivoted. The mounting seat 51 has a through hole 511 which extends from the upper part 501 to the lower part 503 and through which the arm 31 passes slidably in a position parallel to the front wheel support rod 32. A receiving space 513 is formed at the intermediate part 502 of the mounting seat 51 and communicated with the through hole 511.

A generally cylindrical positioning member 54 is fixed to the arm 31 at a position below the mounting seat 51, and can be received removably in the through hole 511 via the lower part 503 while the arm 31 is placed in the first position when the stroller frame (F) is unfolded. The positioning member 54 has an upper portion 54a formed with a groove 542 and a bevel 543, and a lower portion 54b.

A locking element 53 is received movably in the receiving space 513 and is extendible into the through hole 511. The locking element 53 has a hole 532, which is aligned with the through hole 511 for the passage of the arm 31 and the upper part 54a of the positioning member 54, an engaging rib 533 which projects into the hole 532, and a recess 531. The locking element 53 further has a pair of tongues 534 projecting outwardly to engage slidably a pair of guiding slots 514 formed in the intermediate part 502 of the mounting seat 51.

A compression spring 52 is received in the receiving space 513 and extends into the recess 531 of the locking element 53 in order to bias the locking element 53 outwards so as to permit the engaging rib 533 to engage the groove 542, thereby keeping the arm 31 in the first position to prevent its movement relative to the front wheel support rod 32 when the stroller frame (F) is unfolded.

Figure 8:
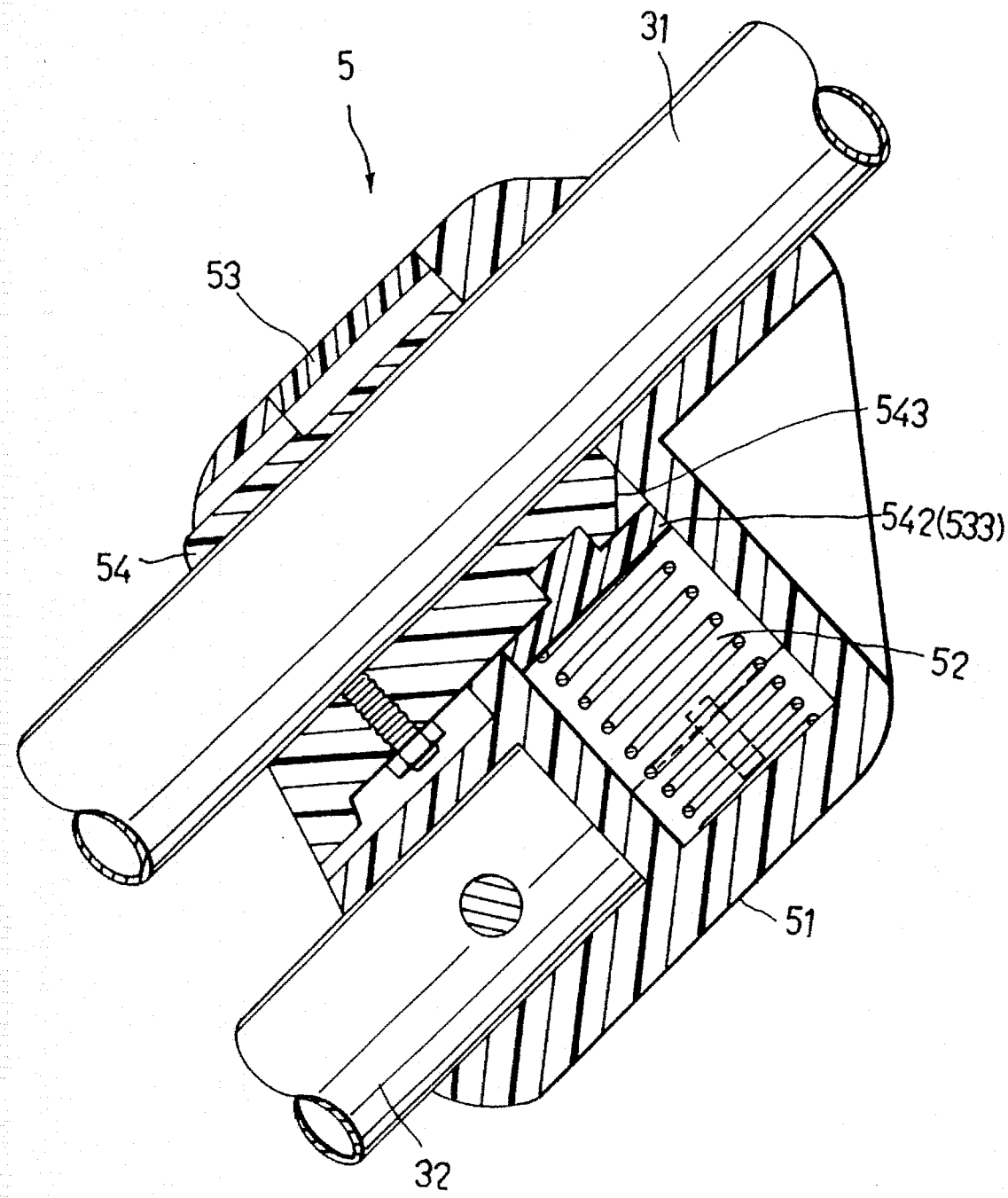
FIG. 8 is a sectional view showing the lock device of the foldable stroller frame of this invention when placed in a first position wherein the frame is unfolded.

Referring to FIGS. 6 and 8, when the stroller frame (F) is unfolded, the handle (H) is lifted upwards relative to the front wheel support rods 32 to place each arm 31 in the first position, wherein the engaging rib 533 of the locking element 53 engages the groove 542 of the positioning member 54 so as to prevent movement of the arm 31 relative to the front wheel support rod 32. It is noted that the positioning member 54 is retained in the through hole 511 of the mounting seat 51, and the upper portion 54a of the positioning member 54 is further retained in the hole 532 of the locking element 53 while the compression spring 52 biases the locking element 53 to permit the engaging rib 533 to engage the groove 542 when the arm 31 is placed in the first position.

Figure 9:
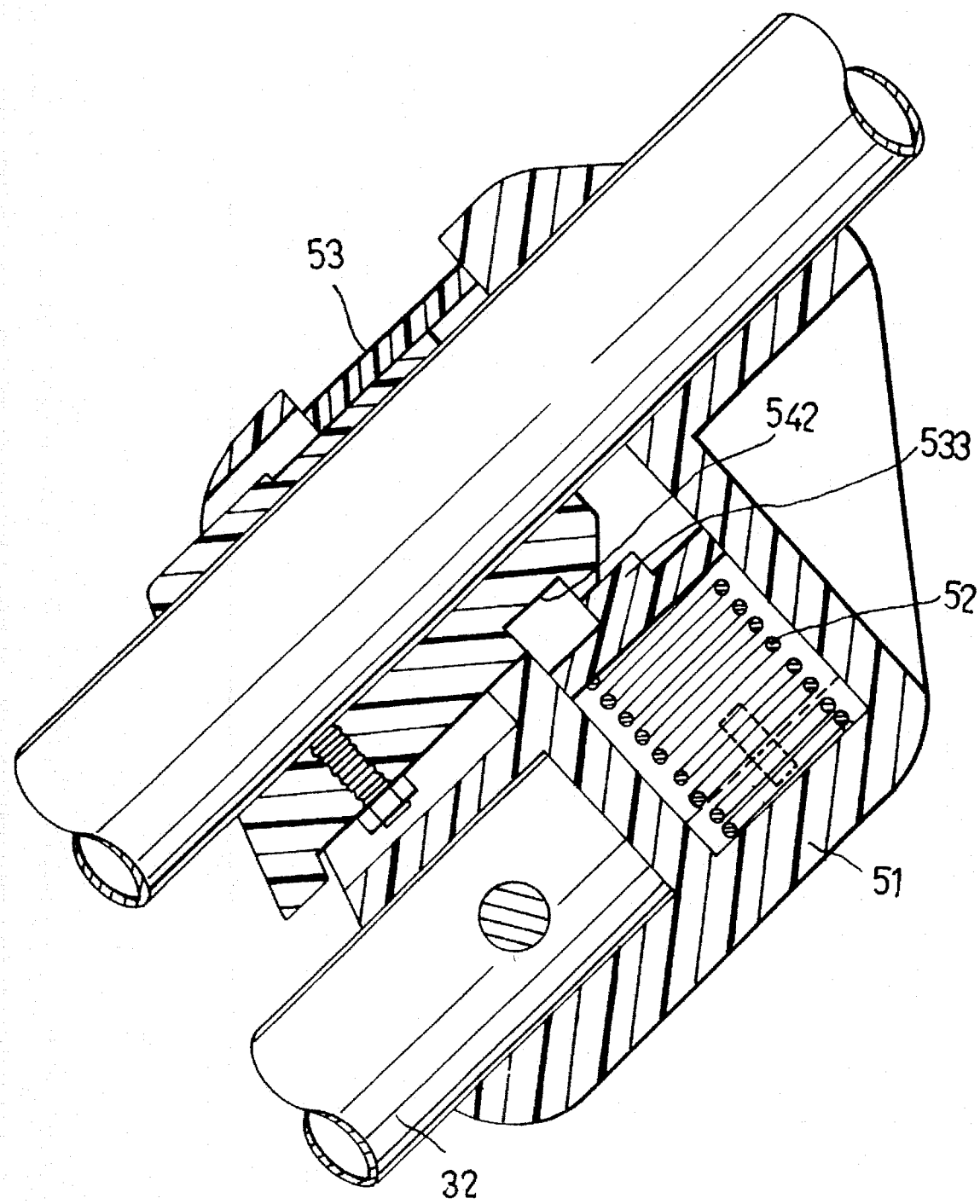
FIG. 9 is a sectional view showing the lock device of the foldable stroller frame of this invention when released from the first position.
Figure 10:
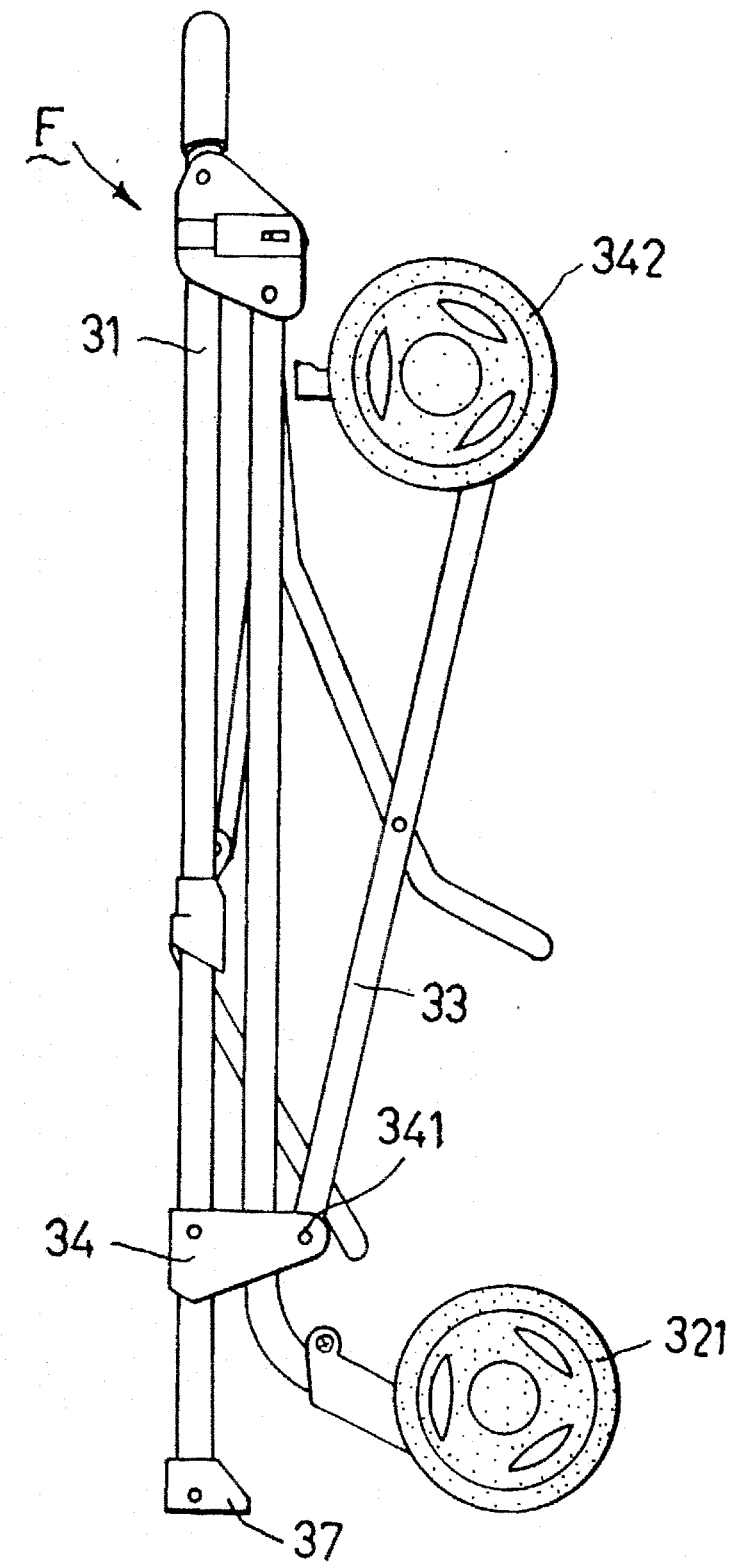
FIG. 10 is a schematic view illustrating how the foldable stroller frame is folded in accordance with this invention.

Referring to FIGS. 9 and 10, in order to fold the stroller frame (F), each locking element 53 is pressed inwardly to permit the release of the engaging rib 533 from the groove 542. The arms 31 are pressed downwardly toward the lower end portions of the front wheel support rods 32 to be juxtaposed to the front wheel support rods 32. The rear wheel support rods 33 are turned upwards toward the front wheel support rods 32 so as to be placed beside the front wheel support rods 32. In this way, the rear wheels 342 are disposed adjacent to the upper end portions of the front wheel support rods 32 away from the front wheels 321 rather than being disposed on the front wheels 321 adjacent to the lower end portions of the front wheel support rods 32. Owing to such an arrangement, the folded stroller frame (F) occupies a smaller space when compared to the conventional foldable stroller frame. Thus, the storage and transport of the stroller frame (F) are more convenient to conduct. The operation and structure of the lock device 5 are simple so as to facilitate the use of the stroller frame (F).

With this invention thus explained, it is apparent that numerous modifications and variations can be made without departing from the scope and spirit of this invention. It is therefore intended that this invention be limited only as indicated in the appended claims.

I claim:

1. A foldable stroller frame, including a pair of front wheel support rods, each of which has an upper end portion and a lower end portion adapted to be connected to a front wheel, a U-shaped handle with two arms, each of which has a lower end portion and each of which is adapted to be slidable relative to a respective one of said front wheel support rods between a first position, wherein said stroller frame is unfolded and wherein each of said arms is locked to said respective one of said front wheel support rods so as to prevent movement relative to said respective one of said front wheel support rods, and a second position, wherein said stroller frame is folded, and a pair of rear wheel support rods, each of which has an upper end portion and a lower end portion adapted to be connected to a rear wheel; wherein the improvement comprises:

a lock device fixed to said upper end portion of each of said front wheel support rods and connected slidably to a respective one of said arms in order to lock said respective one of said arms in said first position against movement relative to said front wheel support rods when said stroller frame is unfolded;

a pivot link mounted slidably to each of said front wheel support rods between said upper and lower end portions thereof and fixed to said respective one of said arms at a position between said lock device and said lower end portion of said respective one of said arms, said upper end portion of a respective one of said rear wheel support rods being pivoted to said pivot link;

a pair of connecting rods, each of which has an upper end portion pivoted to said lock device and a lower end portion pivoted to said respective one of said rear wheel support rods; and said lock device including a mounting seat fixed to said upper end portion of a respective one of said front wheel support rods and pivoted to said upper end portion of a respective one of said connecting rods, said mounting seat having a through hole through which a respective one of said arms passes slidably in a position parallel to said respective one of said front wheel support rods, a positioning member which is fixed to said respective one of said arms and which can be received removably in said through hole while said respective one of said arms is placed in said first position, a locking element received movably in said mounting seat and extendible into said through hole, and a compression spring for biasing said locking element in order to permit said locking element to engage said positioning member so as to lock said respective one of said arms in said first position against movement relative to said respective one of said front wheel support rods when said stroller frame is unfolded.

2. A foldable stroller frame as claimed in claim 1, wherein said lower end portion of each of said arms is provided with an anti-slip piece.

3. A foldable stroller frame as claimed in claim 1, wherein said positioning member has a portion formed with a groove, said locking element having a hole which is aligned with said through hole in said mounting seat for passage of a respective one of said arms and said portion of said positioning member, said locking element having an engaging rib projecting into said hole of said locking element in order to engage said groove when said respective one of said arms is placed in said first position.

4. A foldable stroller frame as claimed in claim 3, wherein said mounting seat is formed with a pair of guiding slots, said locking element having a pair of tongues projecting outwardly to engage slidably said guiding slots.

* * * * *